3,022,248
LOW FLUID LOSS COMPOSITION
Duane B. Anderson and Arthur Park, Tulsa, Okla., assignors to Pan American Petroleum Corporation, Tulsa, Okla., a corporation of Delaware
No Drawing. Filed Sept. 21, 1959, Ser. No. 841,049
20 Claims. (Cl. 252—8.5)

This invention relates to fluids used in well-working operations such as, for example, drilling and well completion operations. More particularly, it is concerned with the use of improved low solids liquids for such purposes.

A drilling completion or work-over fluid should have a low fluid loss to avoid the build-up of a thick mud filter pack on the wall of the hole and to minimize flushing of a production zone. If a low density fluid can be used, clear water has the advantages of faster penetration rates, greater footage per bit and lower cost. Morever, a clear brine completion of work-over fluid results in a faster and cleaner repair job than does mud.

In using drilling fluids of this type, however, fluid loss frequently is too high. Keeping water in the system and preventing it from leaking into the formation is essential to reducing caving and sloughing of water-sensitive shales, etc. In cases of high fluid loss, it is difficult to circulate the well and to circulate sand and cuttings from it. Also, with high fluid loss there is occasionally the danger of getting tools stuck.

Recently, considerable interest has been shown in the use of water as a hydraulic fracturing fluid. While certain types of formations have been successfully fractured with water, its use has been limited generally to formations of low permeability. Because of their cheapness, ease of handling and general availability, it would be most desirable to improve the fluid loss characteristics of fracturing fluids consisting primarily of water so that they could be more widely used in fracturing operations.

Accordingly, it is an object of our invention to provide a novel, aqueous, low fluid loss, low solids composition having the advantages of clear water in both drilling and fracturing operations. Another object of our invention is to employ a mixture of the so-called acid form of lignin and the alkaline form of lignin as the fluid loss retarder in clear water drilling and fracturing compositions, the two forms of lignin being present in concentrations such that a fine dispersion of the lignin materials is produced. It is still another object of our invention to render these clear water fluids stable to fluctuations in harmful salt content, such as sodium chloride and the alkaline earth metal compounds frequently encountered in drilling or hydraulic fracturing operations.

We have now discovered that lignin, a cheap by-product of the paper industry, can be used in certain forms as an efficient fluid loss retarder for low solids aqueous fluids without causing an increase in the viscosity of said fluids. Lignin can be made either soluble or just dispersible in water by the addition of a suitable alkaline compound. The solubility of lignin in water depends on the amount of alkaline material added. We have found that if to a mixture of water and the acid form of lignin, which is insoluble in water, sufficient caustic is added to render the lignin just dispersible, a fluid is produced possessing excellent fluid loss properties. The quantity of caustic or other alkali metal compound required to produce such a dispersion of lignin in water generally may range from about .02 to about 0.1 weight percent.

Instead of adding caustic to a heterogeneous mixture of the acid lignin and water, the acid and alkaline forms of lignin can be mixed in the presence of water to produce an aqueous dispersion of lignin identical in fluid loss characteristics to the composition produced by the addition of caustic to an aqueous mixture of the acid (water-insoluble) lignin. The alkaline form of lignin is available in various degrees of alkalinity. For example, sodium lignates containing 4 percent sodium and about 10 percent sodium are both commercially available. The product containing 4 percent sodium is a purified sodium salt of lignin. The amount of sodium present corresponds to between 1 and 2 mols of sodium per mol of lignin. It is soluble in water and alkali, but insoluble in acids. In the product containing 10 percent sodium, part of the sodium is present as sodium lignate and part is present in the form of free sodium salts, largely sodium carbonate. The purified lignin, hereinafter referred to as the acid form, is generally obtained from pine or other soft wood and is 99.5 percent organic material. It is insoluble in water and acids, but soluble in alkali. The acid lignin is produced by first subjecting wood to caustic digestion. The waste cooking liquor containing sodium lignate is then acidified, causing the acid form to precipitate.

The product containing 4 percent sodium exhibits appreciable ability to reduce fluid loss. A more efficient fluid loss retarder is obtained, however, by mixing the water-soluble and water-insoluble forms of lignin. The water-soluble form preferably contains about 8 to 10 percent sodium, and when combined with the acid form in a weight ratio ranging from about 3:1 to about 1:3, produces a very efficient fluid loss retarder. Certainly mixtures of the alkaline and acid forms of lignin serve as a much better fluid loss reducer than either of these forms alone, as data appearing below will demonstrate. Generally speaking, the percentage of alkali present in the total mixture may range from about 2.5 to about 7.5 weight percent based on lignin. Expressed otherwise, the pH of the final aqueous fluid is preferably from about 7 to about 9. In addition to sodium carbonate and caustic, we may use any of the water-soluble alkali metal compounds to bring about the desired conversion of acid lignin to the alkaline form. Alkaline earth metal compounds, iron compounds and similar materials are unsatisfactory for this purpose because they tend to render lignin water-insoluble.

The quantity of lignin mixture containing the two forms of lignin within the ratios mentioned above may vary from about 1 to about 10 pounds per barrel. Above 10 pounds per barrel, very little fluid loss improvement is generally observed, although the resulting increase in viscosity is slight.

We have found that the presence of a small percentage of liquid hydrocarbon, typically from about 1 to about 5 weight percent, and a surface active agent capable of rendering water-wet surfaces oil-wet enhance the fluid loss characteristics of our compositions. In this connection, the expression "surface active agent" as used in the claims is intended to be limited to those agents that render water-wet surfaces oil-wet. As examples of surface active agents that may be used in preparing the novel compositions of our invention, there may be mentioned the long chain aliphatic amines, e.g., dodecylamine; the Duomeen type amines sold by Armour Industrial Chemical Company, such as decyldimethylenediamine, dodecyldimethylenediamine, tetradecyldimethylenediamine, etc.; quaternary ammonium salts, such as the N-alkyl ammonium chlorides, e.g., the Arquad series of quaternary ammonium salts also sold by Armour, e.g., N-alkyltrimethylammonium chlorides, di-N-alkyldimethylammonium chlorides, etc. These agents are used in emulsifying amounts, i.e., generally from about 0.1 to about 1.0 weight percent.

The liquid hydrocarbons used in improving the fluid loss properties of our fluid may vary widely in composition. Typical examples of suitable hydrocarbons are crude oil, kerosene, diesel oil, gas oil, gasoline, etc. These materials are preferably incorporated into the fluids of our invention in an amount ranging from about 1 to about 5 weight percent, although higher percentages may be used.

In using the fluids of our invention either in drilling or in fracturing operations, brines containing high concentrations of sodium chloride or alkaline earth metal compounds are often encountered. When our fluids come into contact with materials of this type, the lignin is converted to a highly insoluble form, i.e., an alkaline earth metal lignin. As a result, fluid loss can be quite high, causing operations to become inefficient. Accordingly, where this condition is encountered in drilling, caving and sloughing of water-sensitive shales can occur, resulting in sticking of tools in the hole. When fracturing with these compositions under conditions of high calcium content brines, for example, the loss of fluid to the formation becomes high, requiring greatly increased power to maintain the necessary pressure.

We have found, however, that the disadvantages caused by such high alkaline earth metal concentrations can be satisfactorily overcome by the addition of either guar gum or carboxymethyl cellulose to the fluid in a concentration of from about 0.1 to about 1 pound per barrel. Ordinarily, there is no additional stabilizing effect observed with concentrations of these additives in excess of about 1 pound per barrel. Use of either of these materials renders the fluid substantially insensitive to excessive concentrations of alkaline earth metal compounds, as well as other materials which ordinarily tend to render lignin water-insoluble. Fluids to which guar gum or carboxymethyl cellulose has been added are found to be quite stable over practical periods of use without an objectionable increase in viscosity. We have found guar gum and carboxymethyl cellulose to be uniquely suited for this purpose, since numerous materials normally considered the equivalent of guar gum for other purposes such as, for example, agar-agar, gum karaya, acacia, etc., do not exhibit this tendency to inhibit the sensitivity of our fluids to high alkaline earth metal compound-containing brines, or formations containing substantial amounts of the alkaline earths, iron compounds or other materials, such as sodium chloride.

While we do not wish to be limited to any particular theory or mode of operation by which we are able to effect a reduction in fluid loss with the use of lignin in drilling fluids or in fracturing fluids, in accordance with our invention, we believe that the dispersion of mixed lignins is laid down on the walls of the well during either drilling or fracturing operations to form a thin, tough water impervious skin or layer on the face of the formation. This layer, however, remains on the formation face only so long as the pressure at said face exceeds the formation pressure. These lignin dispersions show no tendency to plug the formation permanently. On production of the formation liquids, the layer is removed from the rock by back-flow of said liquids into the well bore.

Our invention will be further illustrated by reference to the data appearing in the table below. In Table I, the data presented therein were obtained by making up separate aqueous mixtures containing the listed components in the amounts indicated. The fluid loss properties of each mixture were then determined by the Standard Field Procedure for Testing Drilling Fluids, Section IV, A.P.I. Test RP 29, 1950.

*Table I*

| Acid Lignin, lbs./bbl. | Alkaline Lignin (4% Sodium) lbs./bbl. | Alkaline Lignin (10% Sodium) lbs./bbl. | Diesel Oil, lbs./bbl. | Additives, lbs./bbl. | Fluid Loss, A.P.I. |
|---|---|---|---|---|---|
| 4 | | | | | 200 |
| | | 4 | | | 250 |
| | 4 | | | | 45 |
| 3½ | | ½ | | | 96 |
| 3 | | 1 | | | 44 |
| 2 | | 2 | | | 39 |
| 2 | | 2 | 8 | | 19 |
| 1½ | | 1½ | 8 | | 18 |
| 1 | | 1 | 8 | | 18 |
| 2 | | 2 | 8 | Arquad 2C[1] 1.6 | 12 |

[1] An N-alkyltrimethylammonium chloride derived from a mixture of coconut fatty acids.

To demonstrate the effectiveness of guar gum and carboxymethyl cellulose as a stabilizer for the novel fluids of our invention, a number of tests were carried out using the list of components in the amount indicated in the table below. The fluid loss data were determined in accordance with the A.P.I. testing procedure referred to above.

*Table II*

| Test No. | Acid Lignin, lbs./bbl. | Alkaline Lignin (10% Sodium) lbs./bbl. | Diesel Oil, gals./bbl. | Gum Additive [1], lbs./bbl. | Pennsylvanian Age Shale, lbs./bbl. | Additive, lbs./bbl. | Fluid Loss, A.P.I., cc. |
|---|---|---|---|---|---|---|---|
| 1 | 2 | 2 | 3 | .3 | | | 12.0 |
| 2 | 2 | 2 | 3 | .3 | | 10 CaSO₄ | 18.0 |
| 3 | 2 | 2 | 3 | .3 | 20 | | 8.5 |
| 4 | 2 | 2 | 3 | .3 | 10 | 10 CaCl₂ | 20.0 |
| 5 | 2 | 2 | 3 | | 10 | | 30.0 |
| 6 | 2 | 2 | 3 | | | 10 CaCl₂ | 100.0 |
| 7 | 2 | 2 | 3 | | | 10 CaSO₄ | 90.5 |
| 8 | 3 | 1 | 3 | | | | 23.0 |
| 9 | 1 | 3 | 3 | | | | 21.0 |
| 10 | 2 | 2 | 3 | | 10 | 10 CaCl₂ | 125.0 |
| 11 | 2 | 2 | 3 | .8 | 10 | 10 CaCl₂ | 9.5 |
| 12 | 2 | 2 | 3 | .5 | 10 | 20 NaCl | 13.0 |
| 13 | 2 | 2 | 3 | .5 | 10 | 10 CaCl₂ | 10.0 |
| 14 | 2 | 2 | 3 | | 10 | | 29.0 |
| 15 | 2 | 2 | 3 | .5 Carboxymethyl Cellulose. | | 10 CaCl₂ | 33.0 |
| 16 | 2 | 2 | 3 | .5 Karaya | | 10 CaCl₂ | 75.0 |
| 17 | 2 | 2 | 3 | .5 Starch | | 10 CaCl₂ | 81.0 |
| 18 | 2 | 2 | 3 | .5 | | 10 CaCl₂ | 14.0 |

[1] Unless specifically named, guar gum was the additive used.

In determining whether or not a fluid will be satisfactory for use in hydraulic fracturing, the rate at which said fluid passes through a barrier of known permeability should be established. Hydraulic fracturing compositions normally regarded as satisfactory should exhibit a fluid loss of 100 cc., preferably 50 cc. or less in 30 minutes, as determined in accordance with the above-mentioned A.P.I. test. Our fluids were subjected to this test and compared to the performance of other compositions falling outside the scope of our invention. Another series of tests was performed in which the fluid was placed under pressure against a wafer-thin core section. A core was mounted in a transparent plastic (Lucite) sleeve, sealed under pressure, and the core wafers were then sliced from the mounted core. The wafers were constructed so that they could be pressed in a high-temperature, high-pressure filter press. The use of the filter press reduces considerably the time required to perform the experiments. The finished core wafers were placed in the filter press and their permeability checked to eliminate those containing small fractures, etc. The wafers were then saturated with 25 centipoise mineral oil under a vacuum prior to the fluid loss tests, and the volumes of liquid passing through the core section measured over different time intervals. In carrying out both sets of tests, the same fluid was used and consisted of a mixture of 2 grams of acid lignin, 2 grams of alkaline lignin (10 percent sodium), and 8 cc. of diesel oil in 350 cc. of water. The conditions used and the results obtained are indicated below. In both tests a pressure of 1000 p.s.i. was used.

*Table III*

| A. P. I. Test | | | Core Wafer Test | | |
|---|---|---|---|---|---|
| Temp., ° F. | Time (Min.) | Volume, cc. | Temp., ° F. | Time (Min.) | Volume, cc. |
| 70 | 1 | 14.0 | 70 [1] | 1 | 18.5 |
| 70 | 4 | 17.5 | 70 [1] | 4 | 21.5 |
| 70 | 9 | 18.5 | 70 [1] | 9 | 23.5 |
| 70 | 16 | 19.5 | 70 [1] | 16 | 24.5 |
| 70 | 25 | 21.0 | 70 [1] | 25 | 26.5 |
| 70 | 36 | 23.0 | 70 [1] | 36 | 28.5 |
| 125 | 1 | 40.0 | 125 [2] | 1 | 9.0 |
| 125 | 4 | 44.5 | 125 [2] | 4 | 11.5 |
| 125 | 9 | 48.5 | 125 [2] | 9 | 14.5 |
| 125 | 16 | 52.0 | 125 [2] | 16 | 16.5 |
| 125 | 25 | 57.0 | 125 [2] | 25 | 19.0 |
| 125 | 36 | 60.0 | 125 [2] | 36 | 21.5 |

[1] Initial permeability of core, 27.1 md.
[2] Initial permeability of core, 28.4 md.

From the foregoing description, it will be apparent that we have provided an aqueous low solids fluid suitable for use as a drilling fluid or as a fracturing liquid. By the use of a dispersion of mixed lignins, as taught by our invention, we are able to deposit a substantially water impervious layer on a formation face, which may then be used in building up high pressures against said face without substantial loss of the fluid carrying said lignins. Accordingly, our invention is intended to cover and include any means or method by which such an impervious layer is laid down in an aqueous system against a permeable barrier.

As used in the present description and claims, the expression "low solids fluids" is intended to refer to fluids containing not more than about 7 weight percent clay solids; usually this figure is in the range of 3 to about 4 weight percent.

We claim:
1. A method of forming a substantially water impervious layer on a permeable barrier which comprises contacting said barrier with an aqueous mixture of lignin containing from about 2.5 to about 7.5 weight percent of a water-soluble alkali metal compound, based on the lignin, which is present in said mixture in a concentration of from about 1 to about 10 pounds per barrel.

2. A method of forming a substantially water impervious layer on a permeable barrier which comprises contacting said barrier with an aqueous mixture of lignin and sufficient water-soluble alkali metal compound to produce a pH in said mixture in the range of from about 7 to about 9, said lignin being present in a concentration of from about 1 to about 10 pounds per barrel.

3. In a process for reducing the loss of fluid to a formation penetrated by a well bore when the face of said formation is exposed to an aqueous low solids fluid, the improvement which comprises incorporating in said low solids fluid a sufficient amount of a mixture of an acid lignin and an alkali metal lignin in which the alkali metal content is not more than about 8 to 10 weight percent and thereafter bringing the resulting mixture into contact with the face of said formation to form a thin, substantially water impervious layer of said lignins on said face, said mixture containing the acid lignin and alkali metal lignin in a weight ratio of from about 3:1 to about 1:3.

4. The process of claim 3 in which said lignins are present in substantially equal amounts by weight.

5. A substantially clear aqueous composition containing as a fluid loss retarder a mixture of from about 1 to about 10 pounds of an acid lignin and an alkali metal lignin per barrel of said composition, said acid and alkali metal lignins being present in a weight ratio ranging from about 1:3 to about 3:1, the alkali metal being present in an amount sufficient to produce a pH in the final mixture of from about 7 to about 9.

6. The composition of claim 5 in which the alkali metal lignin is sodium lignin.

7. A substantially clear aqueous composition containing as a fluid loss retarder a mixture of from about 1 to about 10 pounds of an acid lignin and an alkali metal lignin per barrel of said composition, said acid and alkali metal lignins being present in a weight ratio ranging from about 1:3 to about 3:1, said alkali metal being present in an amount sufficient to produce a pH in the final mixture of from about 7 to about 9, and a water soluble gum selected from the group consisting of carboxymethyl cellulose and guar gum in a concentration of from about 0.1 to about 1 pound per barrel of said composition.

8. The composition of claim 7 in which the water-soluble gum is guar gum.

9. The composition of claim 7 in which the water-soluble gum is carboxymethyl cellulose.

10. The composition of claim 7 to which has been added in a minor amount a normally liquid hydrocarbon in a concentration of at least about 1 weight percent.

11. The composition of claim 7 in which the alkali metal lignin is sodium lignin.

12. A low solids aqueous composition containing as a fluid loss retarder a mixture of an acid lignin and an alkali metal lignin, said acid and alkali metal lignins being present in a weight ratio ranging from about 1:3 to about 3:1, said alkali metal being present in an amount sufficient to produce a pH in the final mixture of from about 7 to about 9, and a surface active agent in a concentration of not more than about 5 weight percent.

13. A substantially clear aqueous composition containing as a fluid loss retarder a mixture of an acid lignin and an alkali metal lignin, said acid and alkali metal lignins being present in a weight ratio ranging from about 1:3 to about 3:1, said alkali metal being present in an amount sufficient to produce a pH in the final mixture of from about 7 to about 9, a water soluble gum selected from the group consisting of carboxymethyl cellulose and guar gum in a concentration of from about 0.1 to about 1 pound per barrel of said composition, and a surface active agent in a concentration of not more than about 5 weight percent.

14. The composition of claim 13 in which the water-soluble gum is guar gum.

15. The composition of claim 13 in which the water-soluble gum is carboxymethyl cellulose.

16. A low solids aqueous composition containing as a fluid loss retarder a mixture of an acid lignin and an alkali metal lignin, said acid and alkali metal lignins being present in a weight ratio ranging from about 1:3 to about 3:1, said alkali metal being present in an amount sufficient to produce a pH in the final mixture of from about 7 to about 9, a water soluble gum selected from the group consisting of carboxymethyl cellulose and guar gum in a concentration of from about 0.1 to about 1 pound per barrel of said composition, a surface active agent in a concentration of not more than about 5 weight percent and a minor amount of a normally liquid hydrocarbon in a concentration of at least about 1 weight percent.

17. The composition of claim 16 in which the water-soluble gum is guar gum.

18. The composition of claim 16 in which the water-soluble gum is carboxymethyl cellulose.

19. An aqueous low solids composition containing as a fluid loss retarder from about 1 to about 10 pounds per barrel of substantially equal amounts by weight of an acid lignin and an alkali metal lignin, said composition having a pH in the range of from about 7 to about 9.

20. An aqueous low solids composition containing as a fluid loss retarder from about 1 to about 10 pounds per barrel of substantially equal amounts by weight of an acid lignin and an alkali metal lignin and guar gum in a concentration of from about 0.1 to about 1 pound per barrel of said composition, said composition having a pH in the range of from about 7 to about 9.

References Cited in the file of this patent

UNITED STATES PATENTS

| | | |
|---|---|---|
| 2,212,108 | Zacher | Aug. 20, 1940 |
| 2,425,768 | Wagner | Aug. 19, 1947 |
| 2,801,218 | Menaul | July 30, 1957 |
| 2,854,407 | Mallory | Sept. 30, 1958 |
| 2,877,180 | Park et al. | Mar. 10, 1959 |

UNITED STATES PATENT OFFICE
CERTIFICATE OF CORRECTION

Patent No. 3,022,248            February 20, 1962

Duane B. Anderson et al.

It is hereby certified that error appears in the above numbered patent requiring correction and that the said Letters Patent should read as corrected below.

Column 4, Table II, under the heading "Fluid Loss, A.P.I., cc." for "90.5" read -- 90.0 --; column 5, line 70, for "sufficient" read -- significant --.

Signed and sealed this 19th day of June 1962.

(SEAL)
Attest:

ERNEST W. SWIDER
Attesting Officer

DAVID L. LADD
Commissioner of Patents